United States Patent [19]

Hilton

[11] 4,105,330

[45] Aug. 8, 1978

[54] PHOTO PRINTING APPARATUS

[76] Inventor: Richie Conrad Hilton, 2/25 Noble Street, Allawah 2218, N.S.W., Australia

[21] Appl. No.: 724,420

[22] Filed: Sep. 20, 1976

Related U.S. Application Data

[63] Continuation-in-part of Ser. No. 530,051, May 1, 1975, abandoned.

[51] Int. Cl.² .......................................... G03B 27/06
[52] U.S. Cl. ................................................ 355/102
[58] Field of Search ............... 355/97, 99, 78, 132, 355/102, 103

[56] References Cited

U.S. PATENT DOCUMENTS

| | | | |
|---|---|---|---|
| 1,381,840 | 6/1921 | Jeapes | 355/103 |
| 2,303,206 | 11/1942 | Garman | 355/99 |
| 2,408,310 | 9/1946 | Hassler | 355/103 |
| 3,313,223 | 4/1967 | Frantzen | 355/102 X |
| 3,715,156 | 2/1973 | Levy | 355/99 X |

FOREIGN PATENT DOCUMENTS

| | | | |
|---|---|---|---|
| 506,531 | 5/1920 | France | 355/103 |
| 2,457,597 | 1/1976 | Fed. Rep. of Germany | 355/99 |
| 24,346 | 11/1963 | Japan | 355/99 |

*Primary Examiner*—Donald A. Griffin
*Attorney, Agent, or Firm*—Ford E. Smith

[57] ABSTRACT

An apparatus for handling a substantially continuous strip or web of photosensitive material is provided with an overlying photographic endless master copy band caused to move in a path that includes a portion at all times in contact with a photosensitive strip or web. The superposed band and web travel through an exposure on an endless carrier band on which they are tightly pressed together by weighted transparent means through which exposing or printing light rays pass to impress the photosensitive material with images derived from the copy band. Following exposure the exposed material and the copy band separate, the latter moving on in its closed path for further printing and the former moving in a separate path to developing and fixing operations.

7 Claims, 7 Drawing Figures

PHOTO PRINTING APPARATUS

This application in part discloses and claims subject matter disclosed in my earlier filed, copending and now abandoned application Ser. No. 530,051 filed May 1, 1975.

BACKGROUND OF THE INVENTION

There are numerous methods of printing that have been practiced over the years in making reproductions of master copy in large quantities. Very briefly, these earlier printing methods are known as letterpress, flexographic, lithographic, silkscreen and gravure printing. All of these systems involve inking a master or a printing plate or roller, and transferring an image derived from the master to paper, either directly or by an offset process. The prior systems are quite complex and require highly skilled personnel to practice them to obtain satisfactory results.

There is a need in the printing art for simplified and economical systems involving relatively low-cost apparatus capable of operation by relatively unskilled workers and operable to give good, accurate black-and-white or color reproductions in relatively small or short runs. Using the prior techniques, a particular problem arises with two-color reproductions which require extremely accurate registry between the impressions made by the several selective and related color plates. Other systems lack versatility or flexibility in the handling of the copy, and require highly skilled persons to accomplish satisfactory results. All of the mentioned prior systems involve a considerable amount of "makeready", a term widely used throughout the world in the printing industry, the meaning of which is actually "lost time", in that unproductive machine and manpower time is exhorbitant and in all cases exaggerates the cost of the finished product.

A good example is found in line color printing. The complicated and sophisticated machinery used today requires a tremendous amount of setting-up time, even for a two-color printing job. Two different sections of a machine must be set up, one for each color. Extremely accurate adjustments have to be made between the printing plates for one color and for the other, so that the paper as it passes through the machine is in accurate registry. To add a third, fourth or several other colors thoroughly complicates the matter, and a great deal of manpower is devoted to obtaining satisfactory results.

It is an object of this invention to make color printing by the use of photosensitive material capable of producing life-like reproductions from color inter-negatives in a continuous manner and without the use of color-separation negatives or color plates. It is a further object of this invention to provide a simple apparatus whereby black-and-white reproductions can be substantially produced continuously with great accuracy and crispness in the resultant end product but without resort to any of the mentioned prior systems.

These and other advantages of this invention will become more apparent in the course of the following description in which is set forth the preferred embodiment of the photoprinting apparatus.

DETAILED DESCRIPTION

Figure 1:
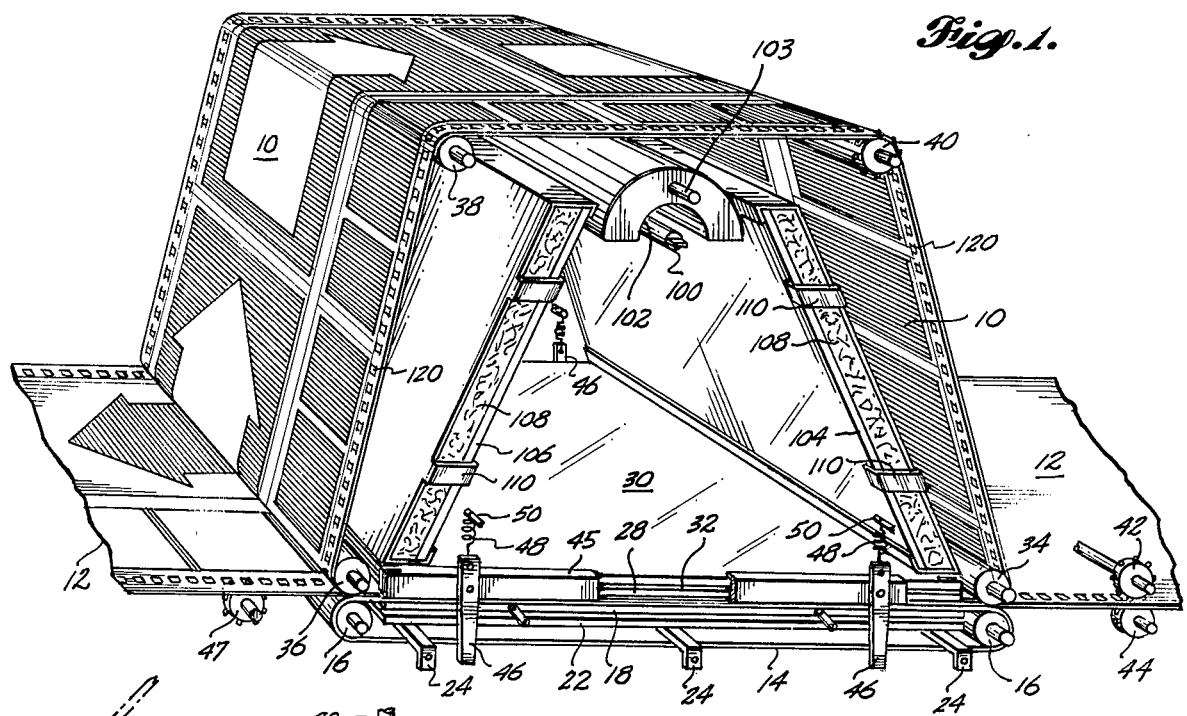
FIG. 1 is a perspective view showing schematically the photoprinting apparatus of this invention, portions being omitted or broken away for convenience of illustration.
Figure 3:
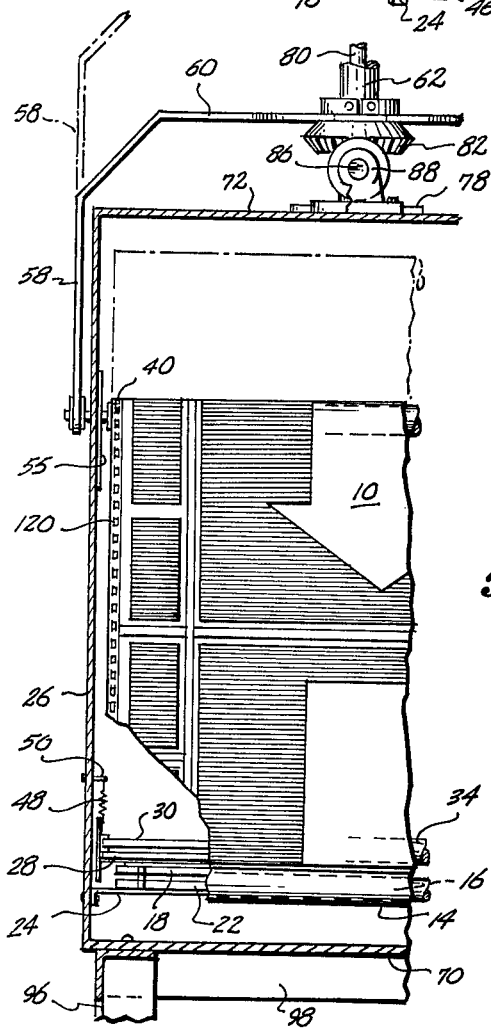
FIG. 3 is a vertical sectional view taken on line 3—3 of FIG. 2.

In this system an endless negative or positive copy band 10 is caused to travel in a closed path, a portion of which is superposed to a strip of photosensitive material 12. The length of material 12 is many times the length of endless copy band 10, preferably being supplied in roll form.

Beneath that travel portion of band 10, during which it intimately overlies material 12, is an endless carrier band 14 mounted on and encircling rollers 16, 16. Between rollers 16, 16 and underneath the upper flight of carrier band 14 is a resiliently supported platen 18. Upward bias to platen 18 is supplied by springs 20 which bear on subplaten 22, in turn supported by frame crossbars 24 attached at their outer ends to upright frame walls 26.

Carrier band 14, photosensitive material 12 and copy band 10 constitute a sandwich of elements that move substantially continuously across platen 18. They are pressed into intimate full-surface contact by the downward-acting superposed transparent plates 28, 30, preferably formed of clear heavy glass. Plates 28 and 30 are separated slightly apart by spacers 31 at the edges to form void 32.

Figure 2:
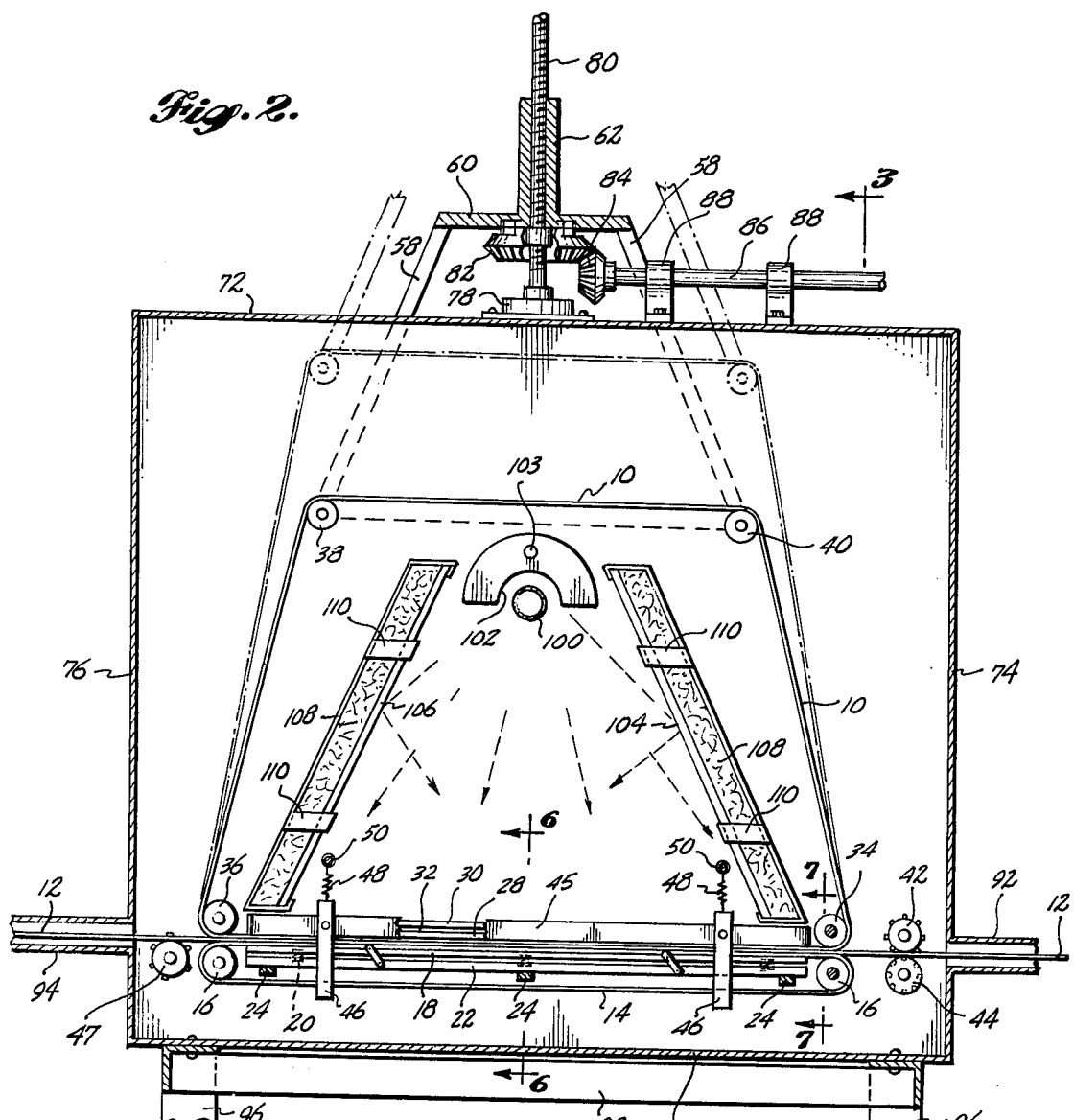
FIG. 2 is a side elevation of the assembly of FIG. 1.

To the right in FIGS. 1 and 2 is shown roller 34 overlying right roller 16 to form a nip in which copy band 10 and photosensitive strip 12 meet as they pass into the exposure zone under weighty plates 28, 30.

After passing across platen 18, the sandwich passes out of the exposure zone between the left carrier band roller 16 and the overlying roller 36, whereupon copy band 10 separates from the exposed photosensitive strip 12 which then passes onward for developing and further processing. The endless copy band which is edge-perforated passes around roller 36 in a rising direction to roller 38 thence rearward in the machine to toothed roller 40 to return downward again to roller 34 to complete the cycle.

As an aid in drawing the photosensitive strip 12 through the machine, its edge is perforated by the toothed wheel 42 working in conjunction with the non-toothed, mating perforating wheel 44. One or both edges may thus be perforated. As strip 12 exits from between left-hand rollers 16, 36, its edge is engaged by the teeth of sprocket 47 to be drawn smoothly through and from the exposure zone of the machine.

The weighted plates 28 and 30 as a unit are resiliently supported from above by clips 46 suspended by springs 48 secured to housing wall 26 by means of fixed pins 50. Clips 46 are attached to frame 45 having instanding jaws that receive the edges of plates 28, 30. Frame 45 surrounds the plates at their peripheries. The springs 48 reduce some of the loading of the sandwich by the weight of the transparent plates, and this mounting means permits the easy introduction of the leading end of strip 12 passing through the nip between right-hand rollers 16, 34 into underlying relation with copy band 10.

To accommodate endless copy bands of various lengths the rollers 38 and 40 are mounted for disposition at various levels. Each roller has a shaft 52 outstanding at each end, as shown typically in FIG. 4. Each upright wall nearest the roller ends has a slot 54 that permits the shaft to extend outside the machine where it is journalled in bearing 56 carried by arm 58. Toothed roller 40 carries drive sprocket 60 (see FIG. 4) deriving force from a suitable drive motor not shown.

Arms 58 and others like it are at the other ends of rollers 38, 40. Arms 58 and cross bars 60 form yokes which straddle the machine from side to side and join at nut 62 centrally located above the mechanism.

In the preferred form of machine embodying this invention, the mechanism is housed in light-tight manner by bottom wall 70, a pair of opposed upright walls 26, top wall 72 and end walls 74, 76. Atop wall 72 is mounted thrust bearing 78 which supports screw 80 threadedly engaged within nut 62. Miter gear 82 is fitted to screw 80 and mates with gear 84 on shaft 86 which is journalled in pillow bearings 88 also supported by top wall 72. When shaft 86 is revolved, the meshed gears 84 and 82 cause screw 80 to rotate and produce a lifting action in nut 62 and the straddling yokes 58, 60.

Figure 4:
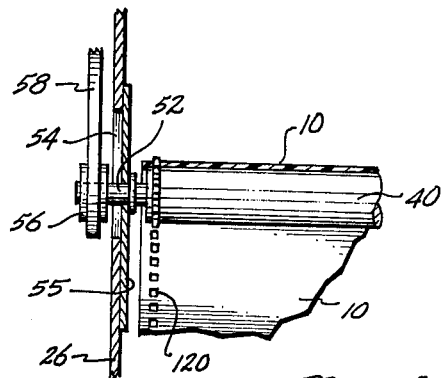
FIG. 4 is an enlarged, partially sectional view in the plane 4—4 of FIG. 2.
Figure 6:
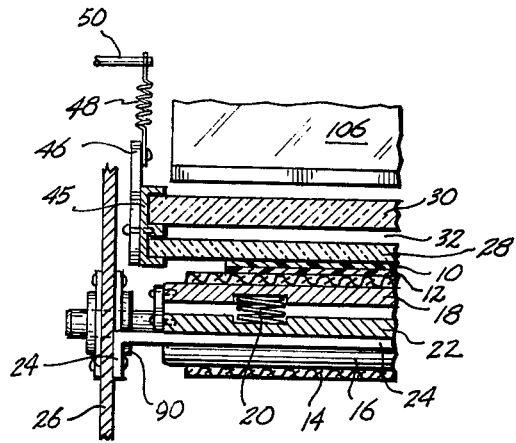
FIGS. 6 and 7 are enlarged, fragmentary elevation views taken in lines 6—6 and 7—7 respectively of FIG. 2.
Figure 7:
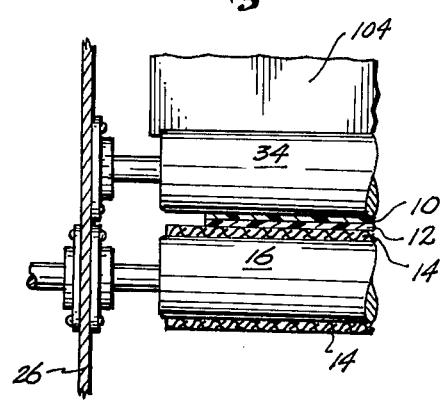

Shafts at the ends of the two rollers 16 extend outside of wall 26 on one side. Rollers 34 and 36 likewise have end shafts which extend toward the housing side walls 26 where they are journalled in bearings 90 as shown in FIG. 6.

Where shafts are movable in slots 52 as in FIG. 4, a light shield 55 is carried by and moves with the roller shaft. The entry and exit of photosensitive strip 12 to the light-tight housing is accomplished through tunnels 92, 94 respectively. It will be understood that material 12 is supplied to the machine from a roll in a light-tight cannister housing up to lengths of 12,000 lineal feet or greater. As the exposed, i.e., printed, strip leaves the machine, it may either be passed directly into a developing bath or it may be re-rolled for subsequent and separate processing. Of course, it will be readily apparent that this machine instead of using light-tight storage means for strip 12 prior to and subsequent to exposure and before developing the whole operation may be in a darkroom, thus obviating making the housing light-tight.

The machine housing is installed at a convenient working height where it is supported on legs 96 and crossbars 98.

Figure 5:
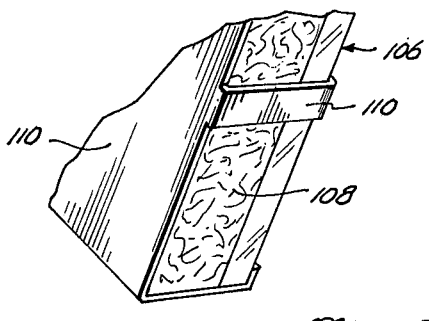
FIG. 5 is a detailed perspective view of a mirror mount.

In the exposure zone above plate 30 is light source 100 mounted beneath an overlying insulated reflector 102 supported by bosses 103 near the apex of an opposed diverging pair of mirrors 104, 106 which, on their backsides, have insulation panels 108. Sheet metal 110, as best seen in FIGS. 2 and 5, forms a backing structure for the mirror assemblies and is attached to side walls 26 to support the mirror assemblies in place. The mirrors receive and reflect outward moving light rays onto and through the plates 28 and 30 to effect the exposure of strip 12.

The endless copy band 10 is prepared in photographic fashion by exposing thereon, while it is a light-sensitive negative, the copy as a positive impression to be printed in this machine. Such copy may include symbols, set type copy, photographs or a combination of such copy elements that will produce more and less dense images in black-and-white or in color, depending on the photosensitive nature of strip 12 and the nature of copy band 10. The length of copy band 12 depends on the number of impressions it is to produce on the photosensitive strip 12. When a short band 10 is used, the rollers 38, 40 will be disposed in the lower position shown in FIG. 2. A longer band 10 will be accommodated by raising rollers 38, 40 as has been described.

It is desirable that travel of band 10 and strip 12 be uniform within the exposure zone, and that the perforation be keyed thereto. Thus, in a conventional manner, toothed sprockets are driven in a synchronized manner from the shafts of rollers 40, 47 and perforator wheel 40. Or synchronization may be supplied in any other convenient manner. In this way it is assured that band 10 and strip 12 move together, the same being held in intimate contact by being pressed as a sandwich to carrier band 14 as it passes over platen 18. As described above, plates 30 and 28 maintain the intimate contact.

Toothed wheel 40 operates on the perforated margin 120 of band 10. Margin 120 may be an integral portion of band 10 or it may be a tape adhesively joined at the edges of band 10 as shown in FIG. 1. These perforated margins of band 10 passing over a pair of wheels 40 insure parallel, slip-free movement of band 10, and since strip 12 moving over the various rollers is timed with wheels 40, the strip 12 and band 10 move together through the machine.

In compliance with the statute, the invention has been described in language more or less specific as to structural features. It is to be understood, however, that the invention is not limited to the specific features shown, since the means and contruction herein disclosed comprise a preferred form of putting the invention into effect. The invention is, therefore, claimed in any of its forms or modifications within the legitimate and valid scope of the appended claims, appropriately interpreted in accordance with the doctrine of equivalents.

What is claimed is:

1. Photoprinting apparatus, comprising:
   a housing means (20, 22, 24);
   an endless carrier band (14) roller-supported in said housing means for unidirectional motion in a fixed plane established by an underlying platen (18, 22);
   an endless negative copy band (10) roller-mounted in said frame above said carrier band (14) for unidirectional travel in a closed path, a portion of which is superposed to a carrier band;
   rotary means for advancing a strip of photosensitive material (12) interposed between said carrier band (14) and said copy band (10) to form within said frame a sandwich assembly, said means being operable to simultaneously advance the elements of said sandwich assembly in said fixed plane;
   downward-acting weighted transparent means (28, 30) within said frame and bearing on said sandwich to provide intimate contact between the elements of said sandwich above said platen (18, 22); and
   a source of intense light rays above said transparent means operable to expose said photosensitive material (12) through said weighted transparent means and said negative copy band (10) to impress said photosensitive material (12) with photographic images.

2. The combination of claim 1 in which the rotary means for advancing a strip of photosensitive material includes a margin perforator apparatus, and a sprocket engages the marginal perforations.

3. The combination of claim 2 in which said copy band is marginally perforated and the roller mount for said copy band includes a drive means engageable with the said copy band marginal perforations.

4. The combination of claim 1 including means for synchronously rotating said sprocket and said drive means.

5. The combination of claim 1 in which the platen underlying the carrier band is upwardly biased.

6. The combination of claim 1 in which the weighted transparent means comprises a unitary pair of sheets of polished glass disposed in spaced-apart relation to each other.

7. The combination of claim 1 in which the roller mount for the copy band includes means for varying the length of the closed path followed by the copy band without varying the length of that portion which is superposed to the carrier band.

* * * * *